United States Patent [19]
McIntyre

[11] Patent Number: 5,541,697
[45] Date of Patent: Jul. 30, 1996

[54] CAMERA WITH ORIENTATION INDICATOR

[75] Inventor: Dale F. McIntyre, Honeoye Falls, N.Y.

[73] Assignee: Eastman Kodak Company, Rochester, N.Y.

[21] Appl. No.: 346,114

[22] Filed: Nov. 29, 1994

[51] Int. Cl.⁶ ................................................ G03B 17/00
[52] U.S. Cl. ........................................................ 354/289.11
[58] Field of Search ...................... 354/75, 76, 289.11, 354/289.12, 288, 295

[56]          References Cited

U.S. PATENT DOCUMENTS

| 935,760 | 10/1909 | Johnson | 354/295 |
|---|---|---|---|
| 1,167,967 | 1/1916 | Anderson | 354/219 |
| 2,286,810 | 6/1942 | Ingels | 354/219 |
| 2,505,140 | 4/1950 | Peltz et al. | 354/219 |
| 3,675,549 | 7/1972 | Adair | 354/219 |
| 4,183,645 | 1/1980 | Ohmura et al. | 354/106 |
| 4,801,793 | 1/1989 | Vaynshteyn | 354/289.12 |
| 5,239,337 | 8/1993 | Takagi et al. | 354/443 |
| 5,258,795 | 11/1993 | Lucas | 354/289.12 |

FOREIGN PATENT DOCUMENTS

WO93/13452   7/1993   WIPO ............................ G03B 13/02

*Primary Examiner*—David M. Gray
*Attorney, Agent, or Firm*—David A. Howley

[57]          ABSTRACT

A camera includes a viewfinder for composing a scene to be recorded and means for determining the camera's orientation relative to at least one axis. The camera further includes visual or audio means, cooperating with the determining means, for indicating the camera's orientation relative to the at least one axis to a camera operator such that the camera operator can hold the camera away from the camera operator's eye, thereby not using the viewfinder to compose a scene, while still ascertaining the orientation of the camera relative to the at least one axis.

7 Claims, 4 Drawing Sheets

CAMERA WITH ORIENTATION INDICATOR

FIELD OF THE INVENTION

The invention relates generally to the field of photography, and in particular to cameras. More specifically, the invention relates to a camera having means for indicating the camera's orientation to a camera operator.

BACKGROUND OF THE INVENTION

U.S. Pat. No. 4,801,793 (the '793 patent) discloses an orientation indicating device which visibly discloses, preferably in the viewfinder of a camera, that the camera is deviated improperly from its normal horizontal position for picture-taking. The device comprises a pendulum controlled indicating circuit including electrically activated display means for indicating before a picture is taken that the camera is deviated inclined-left or inclined-right from horizontal, and therefore the picture should not be taken.

The camera disclosed in the '793 patent requires a camera operator to look through the viewfinder to determine if the camera is being held in a horizontal position. There is no disclosure that the display means is provided anywhere else but in the viewfinder. In some situations, the operator may wish to hold the camera away from their eye, thereby not using the viewfinder, during picture taking. This may occur, for example, when taking a picture of a famous person under crowded conditions in which case the camera may be held overhead.

This scenario is especially likely with a camera which projects a visible light beam prior to picture taking to indicate where the camera is aimed. Such a camera is disclosed in PCT Published Application No. WO 93/13452. This application indicates on page 2, lines 1–3, that a photographer can hold the camera over the photographer's head and still properly aim the camera. If the camera operator desires to hold the camera away from their eye, thus not using the viewfinder, the operator will not have any indication of whether or not the camera is properly oriented (horizontal or vertical).

SUMMARY OF THE INVENTION

The present invention is directed to overcoming one or more of the problems set forth above. Briefly summarized, according to one aspect of the present invention, a camera includes a viewfinder for composing a scene to be recorded and means for determining the camera's orientation relative to at least one axis. The camera further includes means, cooperating with the determining means, for indicating the camera's orientation relative to the at least one axis to a camera operator such that the camera operator can hold the camera away from the camera operator's eye, thereby not using the viewfinder to compose a scene, while still ascertaining the orientation of the camera relative to the at least one axis.

By allowing the camera operator to hold the camera away from the camera operator's eye, thereby not using the viewfinder to compose a scene, while still ascertaining the orientation of the camera relative to the at least one axis, the operator can record higher quality images which are not askew relative to the at least one axis.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Figure 1:
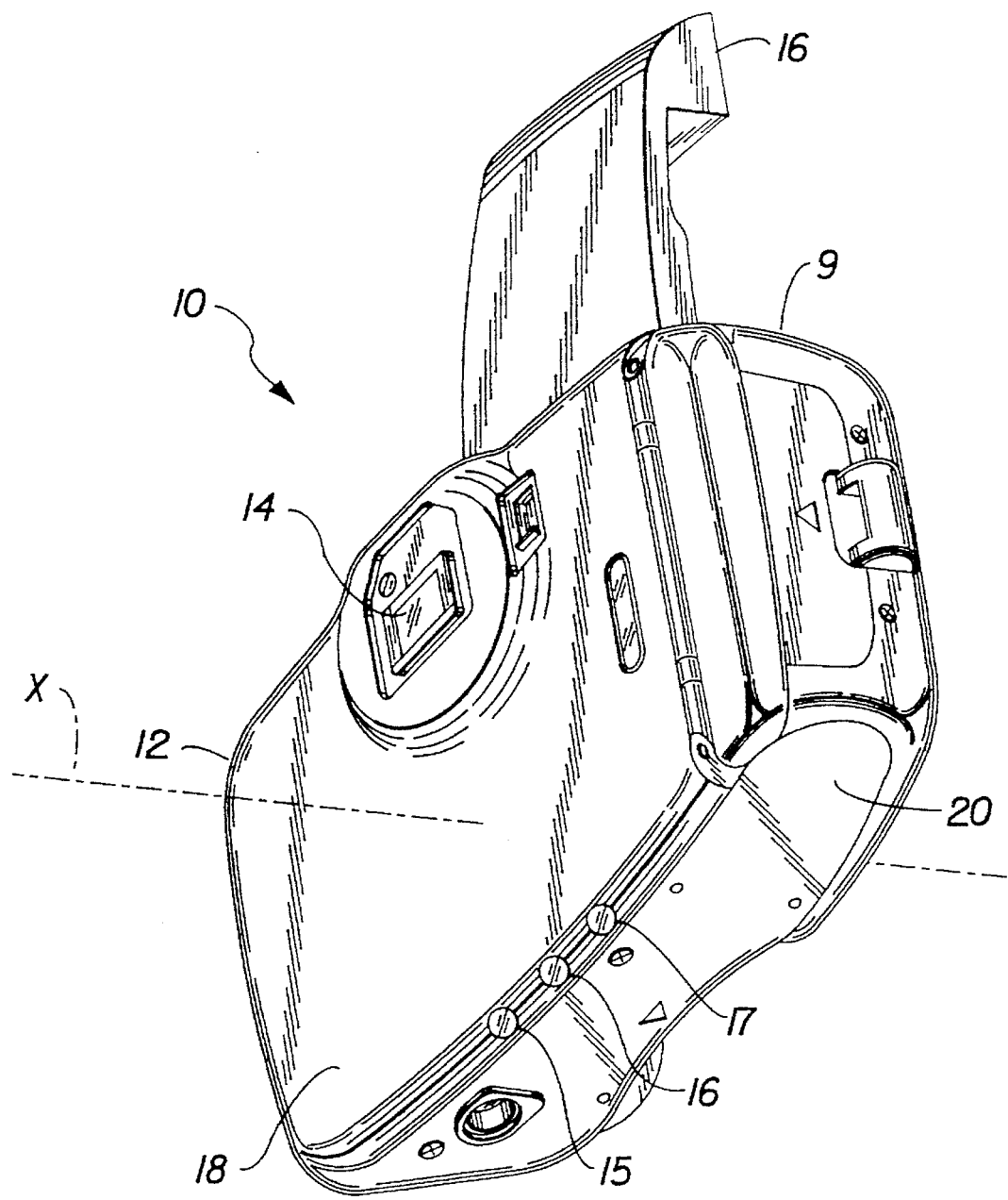
FIG. 1 is a bottom, rear perspective view of a camera incorporating the present invention.
Figure 2:
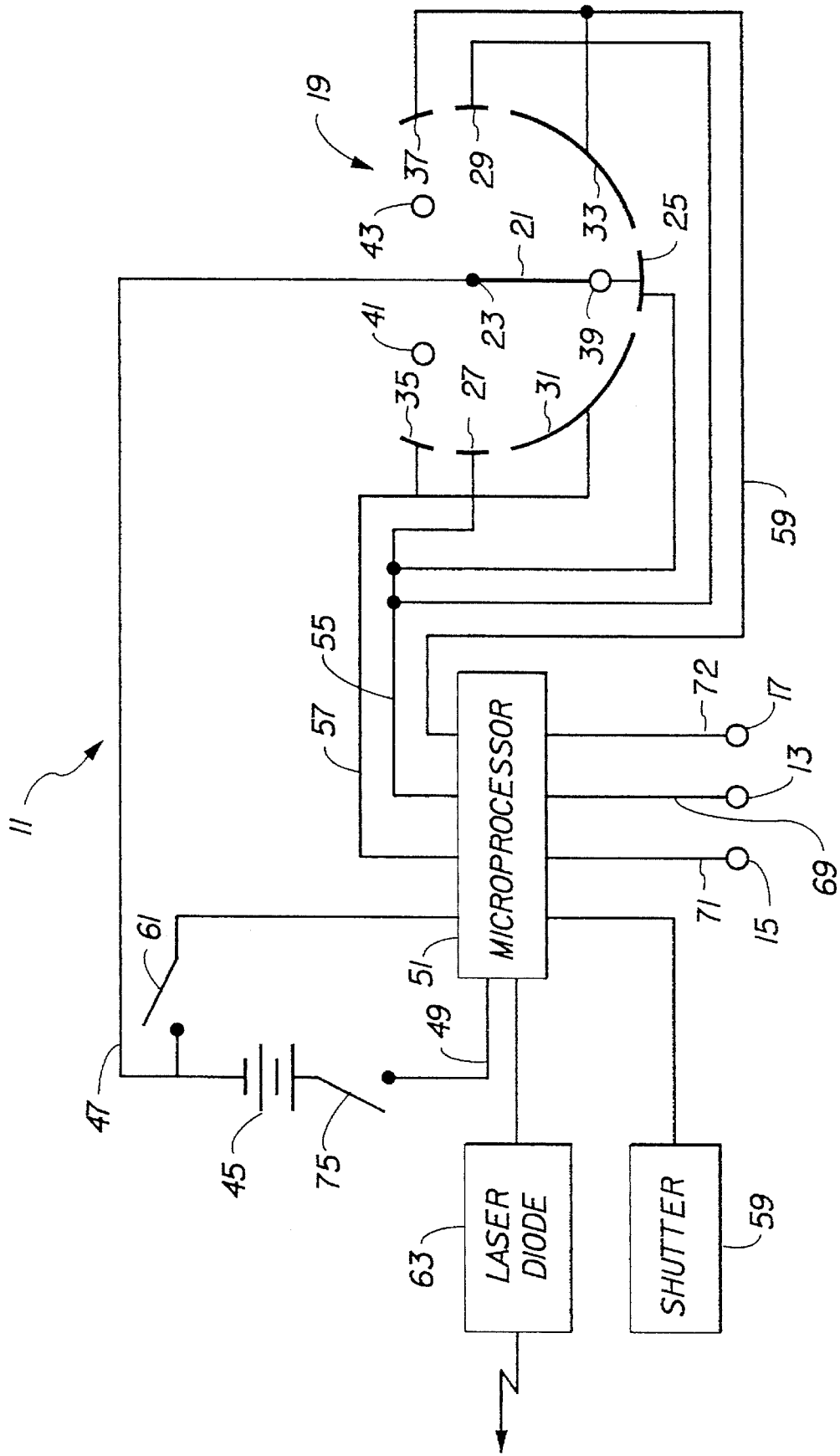
FIG. 2 is a schematic view of an orientation indicating device constructed according to a preferred embodiment of the invention.

Referring now to the drawings, and in particular to FIGS. 1 and 2, there is illustrated, in FIG. 1 known features of a 35 mm still camera 10 including a camera body 12, an optical axis X, a viewfinder 14, an extendible flash 16 and a manually depressible shutter release button (not shown) located on a top surface 9 of camera 10. Also included are a horizontal/vertical orientation light emitting diode (LED) 13 which preferably emits green light, an inclined-left (or inclined counterclockwise) orientation LED 15 which preferably emits red light, and an inclined-right (or inclined clockwise) orientation LED 17 which preferably emits red light.

LEDs 13, 15 and 17 are each electrically activateable before a picture is taken to provide respective visible indications that camera body 12 is oriented in a normal horizontal or vertical position for picture-taking or is deviated improperly from horizontal or vertical. The three LEDs are located adjacent a back surface 18 and a bottom surface 20 of camera 10 so as to be visible when a camera operator is behind and/or below the camera. In addition, LEDs 13, 15 and 17 may be flashed on and off (when electrically activated) by a known pulse circuit, not shown.

As shown in FIG. 2, there is provided an orientation determining device 11 for determining that camera body 12 is oriented about optical axis X in a normal horizontal position to take a horizontal format picture, such as a landscape, is oriented in either one of two reversed vertical positions to take a vertical format picture, such as a portrait, or is oriented in a position deviated improperly from horizontal or vertical, in which case a picture should not be taken.

To electrically activate the respective LEDs 13, 15 and 17, the orientation determining device includes a pendulum switch 19 comprising a pendulum-like contact 21 swingably supported from an electrically conductive pivot pin 23 fixed to camera body 12 and a plurality of spaced immobile contacts 25, 27, 29, 31, 33, 35 and 37, fixed to the camera body. The immobile contacts 25, 27, 29, 31, 33, 35 and 37 are disposed along a semicircular line to make respective electrical contact with the pendulum-like contact 21 as the camera body is oriented about its optical axis X. The pendulum-like contact 21 has a bottom weight 39, ensuring that the contact is urged to remain vertical by gravity. A dampener, such as a relatively light torsional spring, not shown, may be included to dampen or slow down rotational motion of the pendulum-like contact 21 relative to the pivot pin 23 as camera body 12 is oriented about its optical axis X.

The pendulum-like contact 21 is shown in FIG. 2 in electrical contact with the immobile contact 25. This is the rotational position the pendulum-like contact occupies when the camera body is properly oriented in its horizontal position to take a picture. In this instance, the horizontal/ vertical LED 13 can be electrically activated by a microprocessor 51. If the pendulum-like contact 21 is in electrical contact with either one of the immobile contacts 27 or 29, the camera body will be properly oriented in a corresponding one of its two reversed vertical positions. In this instance (as in the former one), the horizontal/vertical LED 13 can be electrically activated by microprocessor 51.

If the pendulum-like contact 21 is in electrical contact with the immobile contact 31, the camera body will be improperly oriented inclined-left (i.e., counterclockwise) from horizontal or will be deviated improperly from vertical. In either instance, the inclined-left LED 15 can be electrically activated by microprocessor 51. If the pendulum-like contact 21 is in electrical contact with the immobile contact 33, the camera body will be improperly oriented inclined-right (i.e., clockwise) from horizontal or will be deviated improperly from vertical. In either instance, the inclined-right LED 17 can be electrically activated by microprocessor 51.

If the pendulum-like contact 21 is in electrical contact with the immobile contact 35, the camera body will be deviated improperly from vertical. In this instance, the inclined-left LED 15 can be electrically activated by the microprocessor. If the pendulum-like contact 21 is in electrical contact with the immobile contact 37, the camera body will be deviated improperly from vertical. In this instance, the inclined-right LED 17 can be electrically activated by the microprocessor.

When the camera body 12 is tilted counterclockwise in FIGS. 1 and 2, about optical axis X from its horizontal position, immobile contact 25 will be removed from electrical contact with pendulum-like contact 21 and immovable contact 31 will be put into electrical contact with the pendulum-like contact. Further movement of camera body 12 counterclockwise about optical axis X to one of its vertical positions will remove immobile contact 31 from electrical contact with pendulum-like contact 21 and put immobile contact 27 into electrical contact with the pendulum-like contact. Counterclockwise movement of camera body 12 from the last-mentioned vertical position will remove immobile contact 27 from electrical contact with pendulum-like contact 21 and put immobile contact 35 into electrical contact with the pendulum-like contact. Similarly, electrical contact between pendulum-like contact 21 and immobile contacts 33, 29 and 37 will be effected when camera body 12 is tilted clockwise about optical axis X from its horizontal position. Respective stops 41 and 43 fixed to camera body 12 limit pendulum-like contact 21 to rotational motion between the two stops.

A battery 45 is connected via a lead 47 to pivot pin 23, and thence to pendulum-like contact 21, and is connected via a lead 49 to microprocessor 51. LEDs 13, 15 and 17 are connected to microprocessor 51 by respective leads 69, 71 and 72. Microprocessor 51 is connected (a) via lead 55 to immobile contacts 25, 27 and 29, (b) via lead 57 to immobile contacts 31 and 35 and (c) via lead 59 to immobile contacts 33 and 37. This arrangement enables respective LEDs 13, 15 and 17 to be electrically activated in accordance with whichever one of the immobile contacts 25, 27, 29, 31, 33, 35 and 37 makes electrical contact with pendulumlike contact 21.

In operation, a shutter release button (not shown) is first manually depressed half-way. This closes a normally open switch 75 to inform microprocessor 51 that the camera operator is ready to record an image. Microprocessor 51 then determines which immobile contact is engaged by contact 21 and then causes the appropriate one of LEDs 13, 15 or 17 to be lit. If the inclined-left LED 15 or the inclined-right LED 17 is lit, camera body 12 is deviated improperly from horizontal or vertical and should be corrected. If the horizontal/vertical LED 13 is lit, camera body 12 is properly oriented for picture-taking.

Closure of switch 75 also causes microprocessor to energize, a visible light emitter, such as laser diode 63, which emits a highly collimated, visible beam of light in the direction that the camera is aimed. As such, the camera operator can ascertain where the camera is aimed without having to look through viewfinder 14. Further details of this aiming mechanism can be found in above-referenced PCT Published Application No. WO 93/13452.

Then, the shutter release button is further manually depressed until it bottoms out, closing a switch (not shown) which informs microprocessor 51 to extinguish laser diode 63 and then actuate a shutter 59. If camera body 12 is properly oriented in a horizontal or vertical position, microprocessor 51 will actuate shutter 59 to momentarily expose photographic film or an electronic image sensor in the camera to scene light, thereby recording an image. If camera body 12 is improperly oriented from a horizontal or vertical position, microprocessor 51 will prevent actuation of shutter 59 until the camera body is properly oriented in a horizontal or vertical position.

A manually operable override switch 61, located on the top surface of camera 10, is closed by an operator in order to record images even when the camera is oriented improperly from horizontal or vertical. This allows the camera operator to defeat the lockout feature of the camera when it is desired to record images which are askew from horizontal or vertical.

Figure 3:
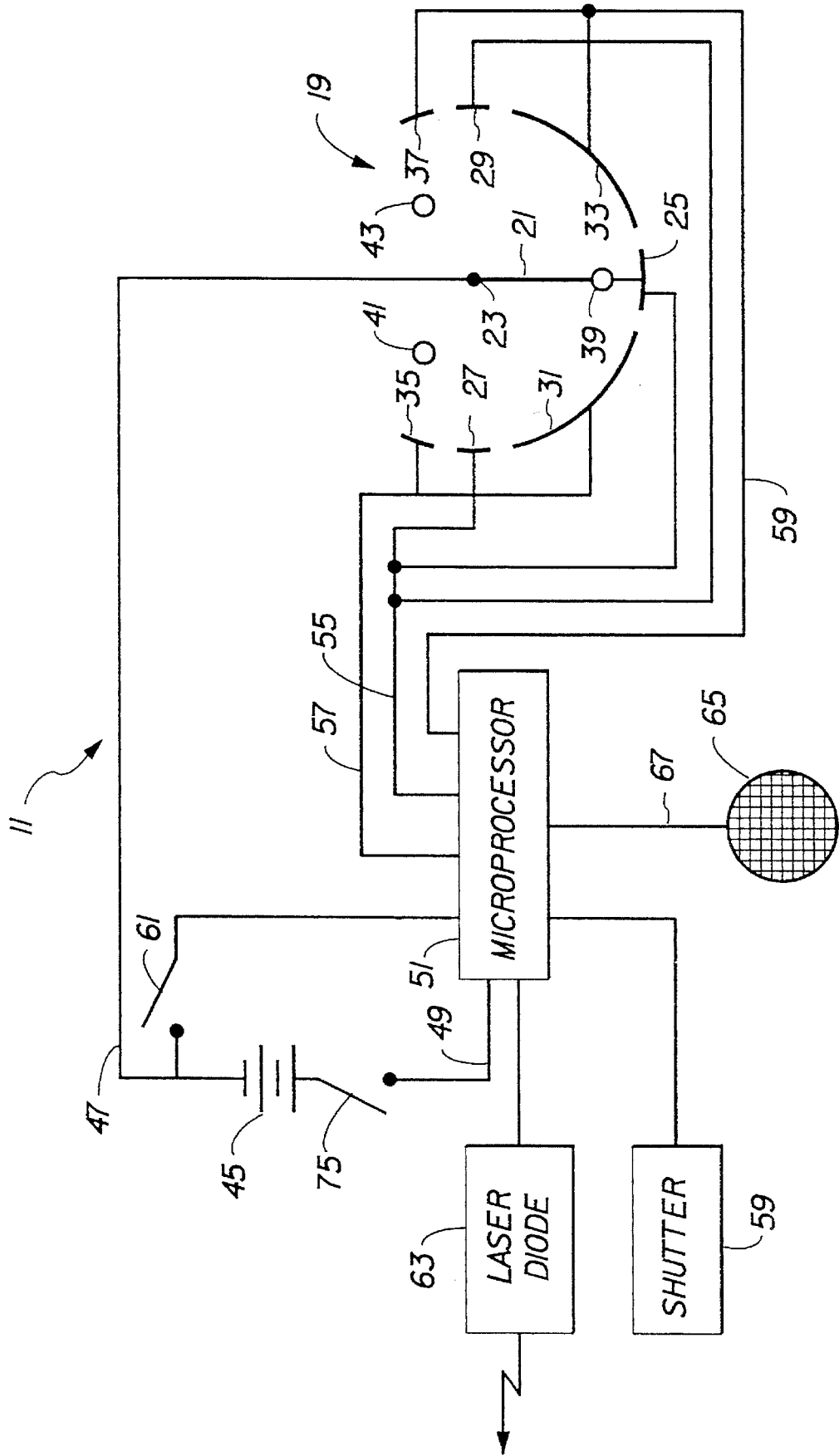
FIG. 3 is a second embodiment of an orientation indicating device.
Figure 4:
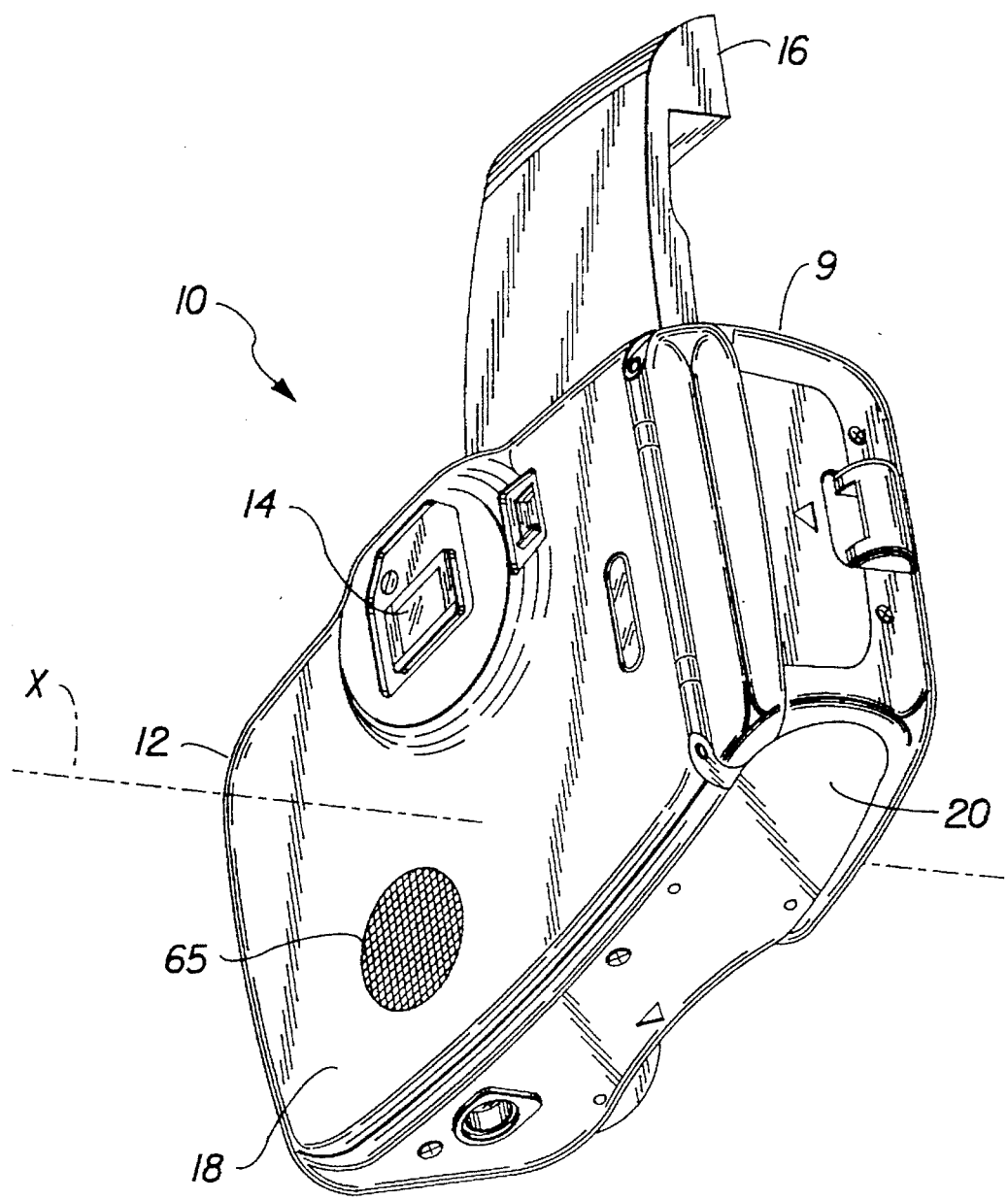
FIG. 4 is a bottom, rear perspective view of a camera incorporating the orientation indicating device of FIG. 3.

A second embodiment of the present invention is shown in FIGS. 3 and 4. FIGS. 3 and 4 are similar to FIGS. 1 and 2 except that LEDs 13, 15 and 17 have been replaced by a speaker 65. Speaker 65 is connected to microprocessor 51 by a lead 67. Microprocessor 51 includes a memory device such as an erasable, programmable read only memory (EPROM) which digitally stores audio information, and a digital-to analog (D/A) converter for converting the digital audio signal into an analog audio signal. When camera body 12 is being held in a horizontal or vertical position, microprocessor 51 retrieves the appropriate digital audio information, such as the word "level", from the EPROM. This digital information is converted to an analog signal by the D/A converter and is amplified to an appropriate level for driving speaker 65 to sound out the word "level". As such, the camera operator is informed that the camera is being held in the proper orientation. Likewise, if the camera is oriented askew from horizontal or vertical, speaker 65 will be energized to sound out the word "tilted". Alternatively, a monotone sound can be emmitted from speaker 65 when the camera is level while no sound is emmitted when the camera is tilted. An advantage of speaker 65 over LEDs 13, 15 and 17 is that with the speaker, an operator can continuously observe the scene to be recorded without having to look away to observe the LEDs on the camera.

The invention has been described with reference to a preferred embodiment. However, it will be appreciated that variations and modifications can be effected by a person of ordinary skill in the art without departing from the scope of the invention.

PARTS LIST

9 top surface
10 camera
11 orientation determining device
12 camera body
X optical axis
13, 15, 17 LEDs
14 viewfinder
16 flash
18 back surface
19 pendulum switch
20 bottom surface
21 contact
23 pivot pin
25, 27, 29, 31, 33, 35, 37 immobile contacts
39 bottom weight
41, 43 stops
45 battery
47, 49, 55, 57, 59, 67, 69, 71, 72 leads
51 microprocessor
59 shutter
61 override switch
63 laser diode
65 speaker
75 switch

I claim:

1. A camera comprising a viewfinder for composing a scene to be recorded and means for determining the camera's orientation relative to at least one axis, is characterized by:

means, cooperating with said determining means, for indicating the camera's orientation relative to said at least one axis to a camera operator such that said camera operator can hold said camera away from the camera operator's eye, thereby not using the viewfinder to compose a scene, while still ascertaining the orientation of the camera relative to said at least one axis, said indicating means being provided on an external surface of the camera.

2. The camera of claim 1, wherein said indicating means includes visual means viewable on an external surface of the camera for indicating the camera's orientation relative to said at least one axis to a camera operator.

3. The camera of claim 1, wherein said indicating means includes audio means which produces one or more sounds for indicating the camera's orientation relative to said at least one axis to a camera operator.

4. The camera of claim 1, further characterized by:

means for automatically preventing the camera from recording an image when the camera is disoriented by greater than a predetermined amount relative to said at least one axis.

5. The camera of claim 4, further characterized by:

manually operable means for disabling said automatic preventing means such that the camera can record an image when the camera is disoriented by greater than a predetermined amount relative to said at least one axis.

6. The camera of claim 1, further characterized by:

means for aiming said camera including a visible light emitter for emitting a collimated visible light beam towards a scene to be recorded, the light beam being reflected from the scene back to a camera operator, thereby indicating to the camera operator where the camera is aimed.

7. A camera comprising a viewfinder for viewing a scene to be photographed, and an orientation indicating device for providing an indication of the orientation of said camera with respect to the scene, is characterized in that:

said orientation indicating device includes means for providing the indication outside the viewfinder at a location on said camera where it can be recognized before the scene is photographed.

\* \* \* \* \*